Patented Feb. 20, 1934

1,947,781

UNITED STATES PATENT OFFICE 1,947,781

PROCESS FOR PRODUCING COLORED COATINGS OF GLASS

Norbert Kreidl, Reitendorf a/Tess, Czechoslovakia

No Drawing. Application November 8, 1929, Serial No. 405,852, and in Czechoslovakia August 7, 1929

3 Claims. (Cl. 49—88)

In the glass industry red coatings on glass (lazuren) are mostly produced by means of copper salts, which first of all are burned on the glass and thereupon are burned again with reducing agents such as sawdust, charcoal, and the like, whereby the copper salt is reduced and the red coating is formed.

The present invention depends on the fact that by using sulphide glasses, that is, glasses containing sulphides or colored with sulphides, especially black glasses, the second burning process may be avoided and thus colored coatings are directly obtainable on the glass by a single burning.

The process according to the invention, therefore, provides a new way of applying colored glass coatings uniformly, or locally at any desired places, on the surface. The process therefore, also enables any desired patterns to be produced.

What I claim is:

1. Process for producing red colored coatings, patterns, or the like on glasses, comprising applying and then burning on sulphide glasses, compositions containing those copper compounds which are reducible by sulphide glasses.

2. Process for producing red colored coatings, patterns, or the like on glasses, comprising applying and then burning on sulphide glasses those copper compounds which are reducible by sulphide glasses.

3. Process for producing red colored coatings, patterns, or the like on glasses, comprising applying and then burning on black sulphide glasses those copper compounds which are reducible by sulphide glasses.

NORBERT KREIDL.